A. STEINBART.
CONDENSER.
APPLICATION FILED OCT. 30, 1909.
959,640.
Patented May 31, 1910.
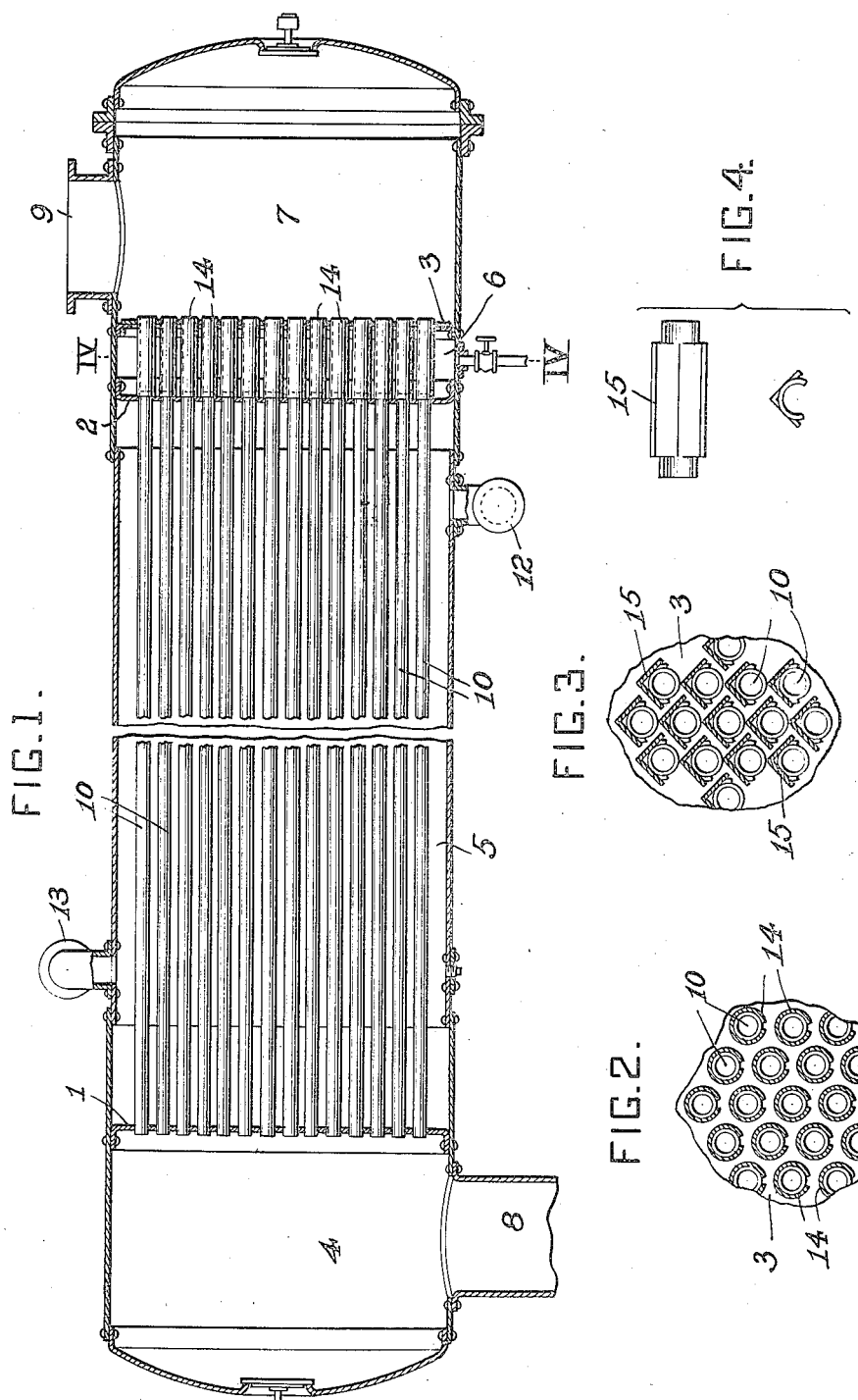

UNITED STATES PATENT OFFICE.

ALFRED STEINBART, OF PITTSBURG, PENNSYLVANIA.

CONDENSER.

959,640.  Specification of Letters Patent.  Patented May 31, 1910.

Application filed October 30, 1909. Serial No. 525,558.

*To all whom it may concern:*

Be it known that I, ALFRED STEINBART, residing at Pittsburg, in the county of Allegheny and State of Pennsylvania, a citizen of the United States, have invented or discovered certain new and useful Improvements in Condensers, of which improvements the following is a specification.

The invention described herein relates to certain improvements in condensers whereby moisture may be removed from gaseous fluids, the construction being especially applicable for use in the removal of moisture from air for blast furnaces.

The invention is hereinafter more fully described and claimed.

In the accompanying drawings forming a part of this specification Figure 1 is a vertical section on an enlarged scale of one of the condensers; Fig. 2 is a sectional detail view, the plane of section being indicated by the line IV—IV Fig. 1; Fig. 3 is a similar view illustrating a modification and Fig. 4 shows detail views of the construction shown in Fig. 3.

In the practice of my invention the condenser consists of a horizontal shell divided by transverse partitions or tube sheets 1, 2 and 3 into receiving, condensing, separating and discharge chambers 4, 5, 6 and 7. The chamber 4 is provided with an inlet pipe 8, and the chamber 7 with an outlet 9. A plurality of tubes 10 extend through the cooling or condensing chamber 5 formed by the diaphragms or tube sheets 1 and 2, the ends of such tubes being expanded into suitable openings in the tube sheets. These tubes form the communication or connection between the receiving chamber 4 and the separating chamber 6. Provision is made for the introduction of a cooling medium, as water, into the chamber 5, the water preferably entering through a pipe 12, and passing out through a pipe 13, so that the direction of flow of water along and around the tubes and through this chamber will be in opposition to the direction of flow of the gaseous fluid through the tubes.

In the separating chamber 6 are arranged a plurality of deflectors or shields 14, which in the construction shown in Figs. 1 and 2 consist of short lengths of tubes inserted through openings in the partition 3 and fitting over the projecting ends of the tubes 10. The outer ends of these tubes are secured in the holes in the partition 3, but only fit sufficiently tight to insure their remaining in position. These tubular shields are provided with outlets in their lower sides, said outlets being formed by either longitudinally slotting, for the whole or a portion of their length, these tubular shields, or by a series of holes in their lower sides. As the air passes through the tubes 10 any moisture contained therein or carried thereby will be condensed on the inner walls of these tubes and will be carried forward into the tubular shields 14 from which it will escape by the slots into the chamber 6 and can be drawn off as desired.

The condenser as a whole may be supported so as to leave a slight inclination or the condensing tubes 10 may be inclined so that the condensed liquid will flow toward the separating chamber 6. As will be readily understood, if the condensation was allowed to discharge directly into the chamber 6 from the ends of the tubes 10 that discharged from the upper series of tubes would drop down through the streams of air passing through the chamber from the lower tubes. But by providing these shields or deflectors the moisture or condensation from the upper tubes will drop down onto the shields of the lower tubes and be prevented from being mixed with the air passing through or below such shields into the outlet chamber 7. As the main or principal function of these shields is to prevent moisture discharged by the upper tubes 10, dropping down into the streams of air from the lower tubes, the construction shown in Fig. 3 can be employed. The shields shown in Figs. 3 and 4 consist of bent plates 15 provided with end portions adapted respectively to fit over the projecting ends of the tubes 10 and to rest in the openings in the diaphragm 3. As shown in Fig. 3 these bent plates are made of sufficient width to form roofs over the streams of air flowing from each of the tubes 10. The several parts forming the means for separating the moisture from the air including the diaphragm 3 are so constructed that little or no resistance will be presented to the passage of the air through this chamber and into the outlet chamber 7. As the pressure within this chamber 6 is very nearly that of the pressure of the air within the tubes, and also within the outlet chamber, the streams of air will pass from the tubes 10 through the separating chamber with little or no expansion or enlargement.

I claim herein as my invention:

1. A condenser having in combination a horizontally arranged shell provided with inlet, separating and outlet chambers, a plurality of tubes extending from the inlet chamber into the separating chamber, means for cooling such tubes intermediate of the inlet and separating chambers, means in the separating chamber for removing condensation from the gaseous fluid and means for conducting the gaseous fluid to the outlet chamber.

2. A condenser having in combination a horizontally arranged shell provided with inlet, separating and outlet chambers, a plurality of tubes extending from the inlet chamber to the separating chamber, means for cooling such tubes intermediate of the inlet and separating chambers, openings from the separating chamber into the outlet chamber substantially in line with the discharge ends of the tubes and shields or deflectors arranged to prevent the condensation entering the streams of air passing through the separating chamber.

3. A condenser having in combination a plurality of horizontally arranged tubes for the passage of gaseous fluids, means for cooling the tubes intermediate of their ends and means for changing the direction of flow of condensation, and means for preventing the condensation escaping from the upper tubes commingling with the gaseous fluid from the lower tubes.

4. A condenser having in combination a plurality of horizontally arranged tubes for the passage of gaseous fluids, means for cooling such tubes intermediate of their ends, and shields interposed between the streams of air escaping from the ends of the tubes.

5. A condenser having in combination a plurality of horizontally arranged tubes for the passage of gaseous fluids, means for cooling such tubes intermediate of their ends, and tubular sections provided with openings in their lower sides supported in line with the discharge ends of the tubes.

In testimony whereof, I have hereunto set my hand.

ALFRED STEINBART.

Witnesses:
  Sue B. Fritz,
  Francis J. Tomasson.